United States Patent [19]

Plenzler et al.

[11] Patent Number: 4,679,997
[45] Date of Patent: Jul. 14, 1987

[54] APPARATUS FOR DELIVERING LABELS TO BLOW MOLDS OF A PLASTIC CONTAINER BLOWING MACHINE AND REMOVING THE BLOWN CONTAINERS WITH THE LABELS THEREON

[75] Inventors: John A. Plenzler; Thomas J. Krall, both of Toledo; Casimir W. Nowicki, Sylvania, all of Ohio

[73] Assignee: Owens-Illinois, Inc., Toledo, Ohio

[21] Appl. No.: 801,441

[22] Filed: Nov. 25, 1985

[51] Int. Cl.⁴ .............................................. B29C 49/24
[52] U.S. Cl. ................................ 425/126 R; 264/509; 425/503; 425/522; 425/534
[58] Field of Search ................ 264/509; 271/103, 106, 271/107; 425/126 R, 503, 504, 522, 539, 540, 525, 534, 538

[56] References Cited

U.S. PATENT DOCUMENTS

| | | | |
|---|---|---|---|
| 3,767,747 | 10/1973 | Uhlig | 425/538 |
| 3,781,395 | 12/1973 | Uhlig | 425/525 |
| 3,978,184 | 8/1976 | Dybala et al. | 425/534 |
| 4,479,771 | 10/1984 | Slat et al. | 425/504 |
| 4,498,854 | 2/1985 | Ross | 425/522 |
| 4,549,863 | 10/1985 | Bourgeois | 425/504 |
| 4,585,408 | 4/1986 | Darr | 425/539 |

*Primary Examiner*—Jay H. Woo
*Assistant Examiner*—Timothy W. Heitbrink
*Attorney, Agent, or Firm*—Philip M. Rice

[57] ABSTRACT

A method and apparatus for delivering labels to the blow molds and removing blown containers with the labels thereon from a blow molding apparatus wherein the apparatus precludes access to the upper or lower ends of the molds. A carriage is reciprocated horizontally between a position externally of the blow molds and a position within the blow molds. The carriage supports pick-up heads that pick up labels from magazines, deliver them between the mold halves and deposit them on the mold halves. The carriage also supports container removal devices that engage the blown containers with the labels thereon and remove them from a position between the mold halves.

11 Claims, 10 Drawing Figures

APPARATUS FOR DELIVERING LABELS TO BLOW MOLDS OF A PLASTIC CONTAINER BLOWING MACHINE AND REMOVING THE BLOWN CONTAINERS WITH THE LABELS THEREON

This invention relates to apparatus for blowing plastic containers and particularly to a method and apparatus for moving labels into position in the molds prior to molding the containers, depositing the labels on the molds, and removing the blown containers with the labels applied thereto.

BACKGROUND AND SUMMARY OF THE INVENTION

In blowing plastic containers, it has become known to apply labels to a final blow mold so that when the hollow plastic article is blown, the label becomes positioned on the blown articles such as a container.

However, in one type of method and apparatus for blowing hollow plastic articles such as a containers, the nature of the apparatus is such that extreme difficulty has been encountered in applying or positioning labels within the mold halves. See U.S. Pat. Nos. 3,767,747, 3,781,395 and 3,978,184. In such apparatus, a freely pendant tube is extruded vertically downwardly and separate preform and final blow molds are shiftable horizontally toward and away from the orifice. In such apparatus, access is not readily available to the area above or below the molds and to one side of the molds.

Among the objectives of the present invention are to provide a method and apparatus wherein the labels are applied by a horizontal movement and, in addition, the blown containers are removed.

In accordance with the invention, the method and apparatus for applying labels to the blow molds and removing blown containers with the labels thereon from a blow molding apparatus wherein the apparatus precludes access to the upper or lower ends of the molds includes a carriage which is reciprocated horizontally between a position externally of the blow molds and a position within the blow molds. The carriage supports pick-up heads that pick up labels from magazines and deliver them between the mold halves and deposit them on the mold halves. The carriage also supports container removal devices that engage the blown containers with the labels thereon and remove them from a position between the mold halves.

DESCRIPTION

Figure 1:
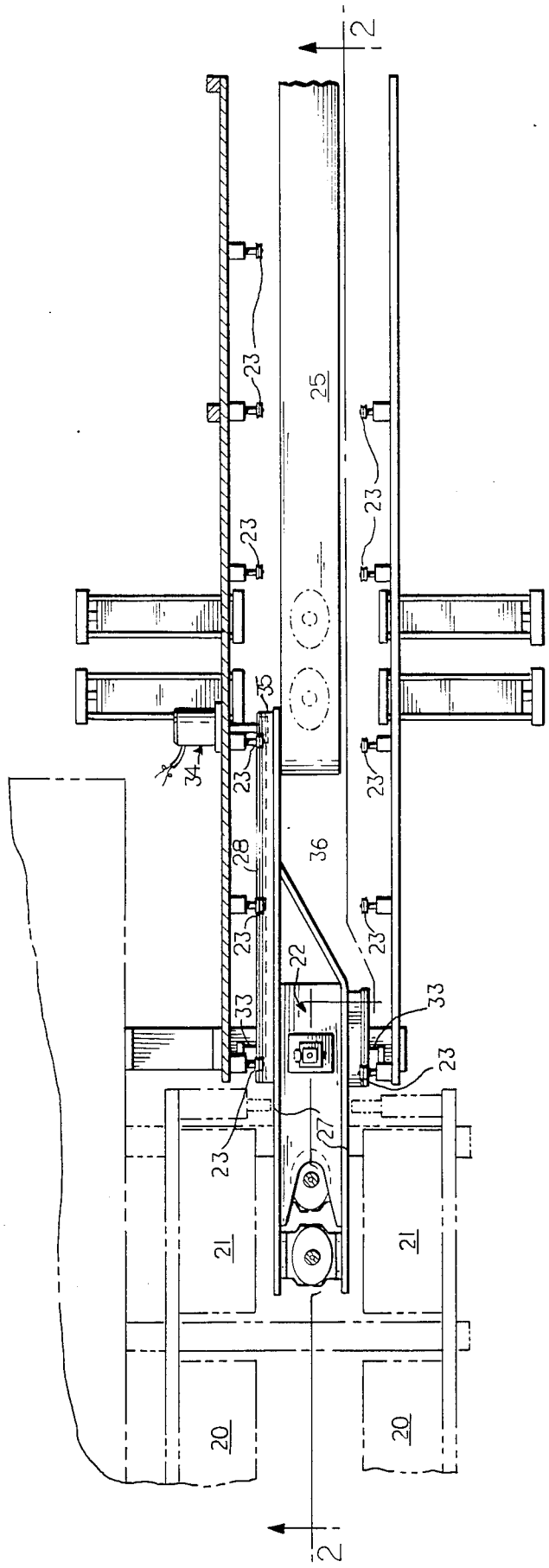
FIG. 1 is a part sectional plan view of an apparatus embodying the invention, parts being broken away.
Figure 2:
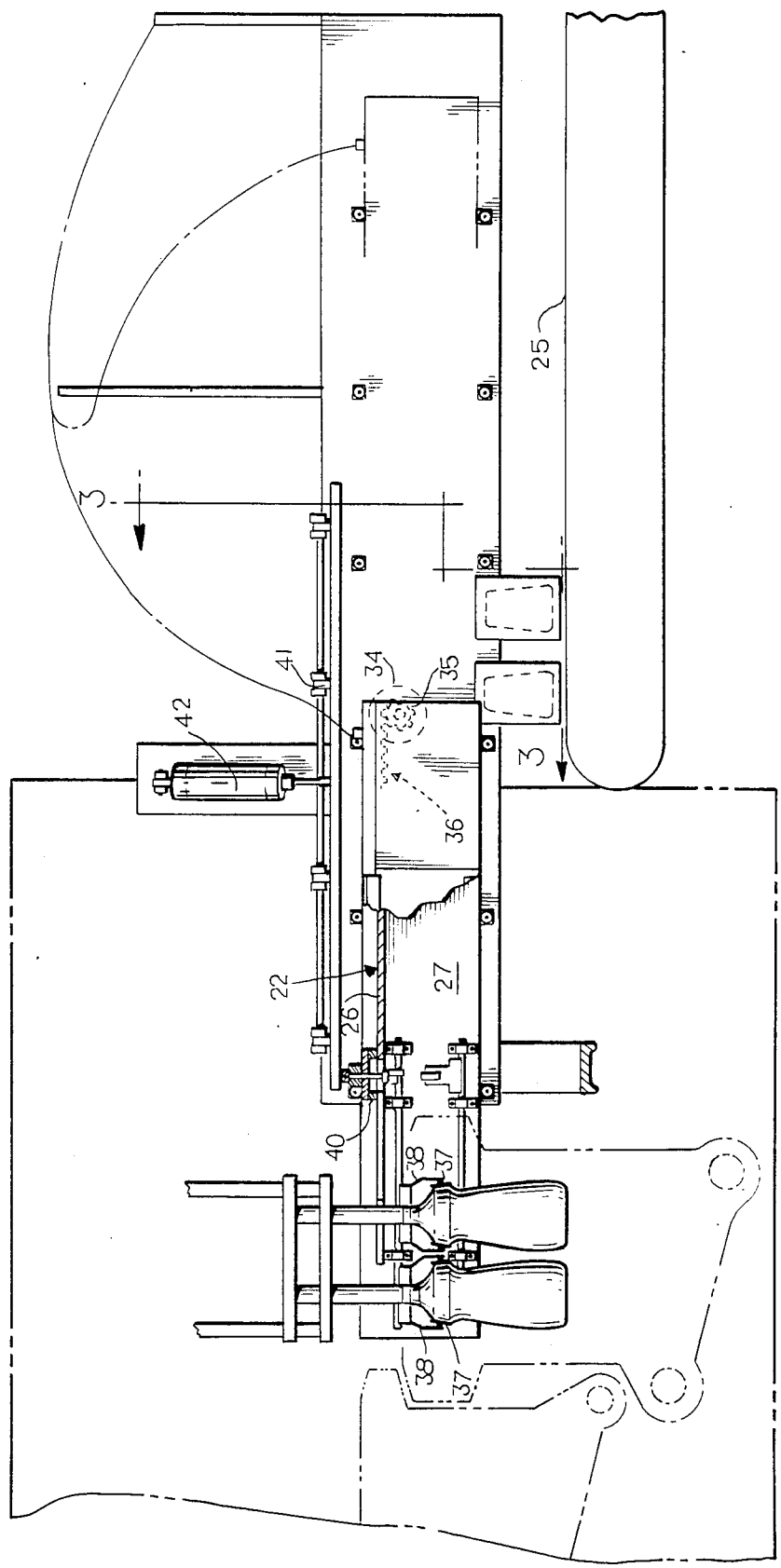
FIG. 2 is a fragmentary sectional view taken along the line 2—2 in FIG. 1.

Referring to FIG. 1, the invention relates particularly to blow molding apparatus which includes preform mold halves 20 and final blow mold halves 21 which are shiftable laterally or horizontally from a position underlying an extruder which forms a freely extruded tubular parison such as shown in U.S. Pat. Nos. 3,767,747, 3,781,395 and 3,978,184, which are incorporated herein by reference. In such apparatus, conventional label applying mechanism cannot readily be used because the mechanism is shiftable and not accessible from the top, bottom or left, as viewed in FIG. 1.

In accordance with the invention, a carriage 22 is mounted on a track defined by longitudinally spaced rollers 23 and is movable horizontally between a position exterior of the blow molds 21 and a position within the blow molds. As the carriage 22 is shifted, labels are picked up from magazines M and delivered to a position between the mold halves 21. In addition, the previously formed containers which are supported by blow pipes are preferably picked up by devices on the carriage 22 and delivered onto a horizontal conveyor 25 as the carriage returns to its position outside of molds.

Figure 3:
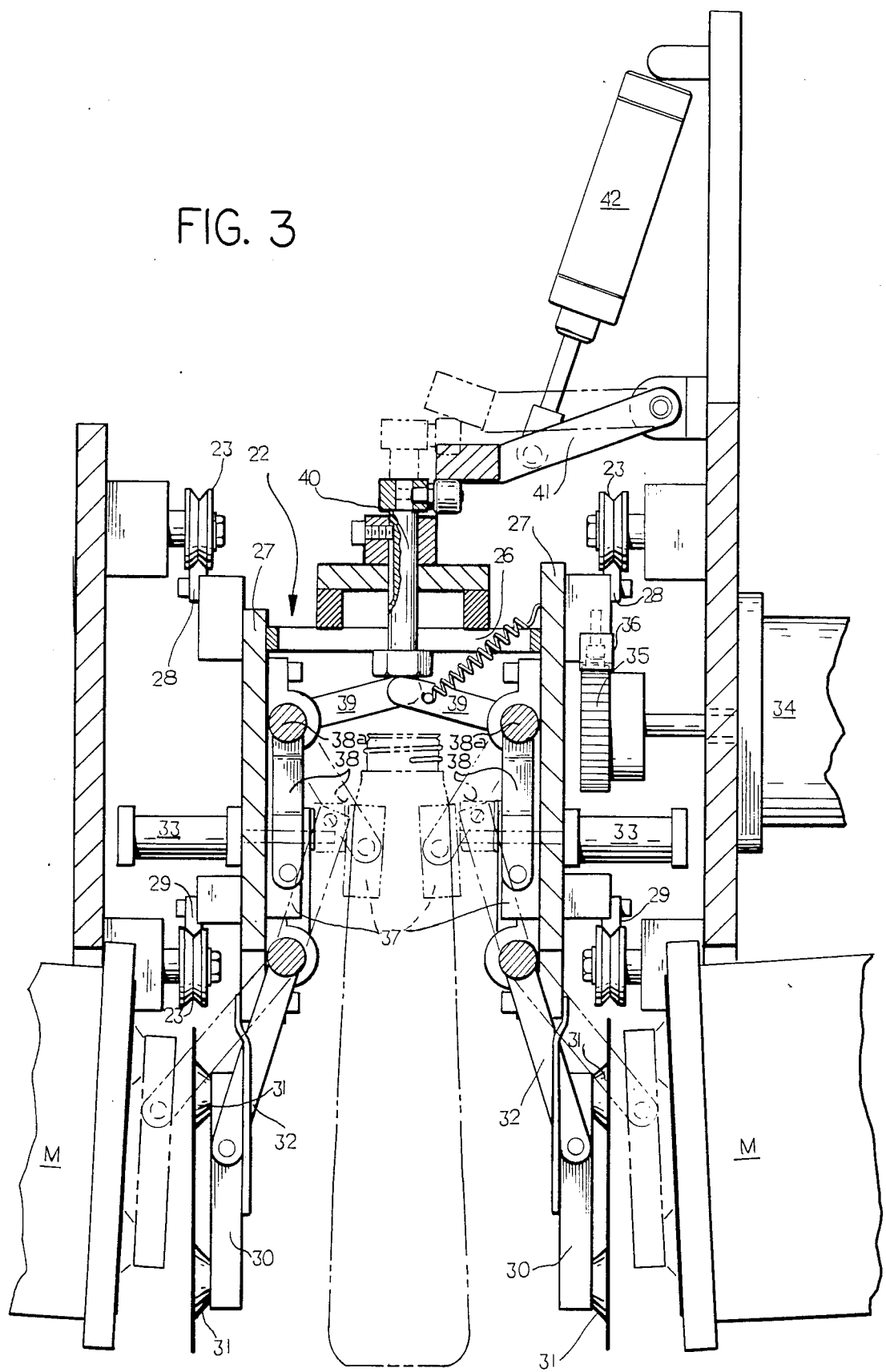
FIG. 3 is a fragmentary sectional view taken along the line 3—3 in FIG. 2.
Figure 4:
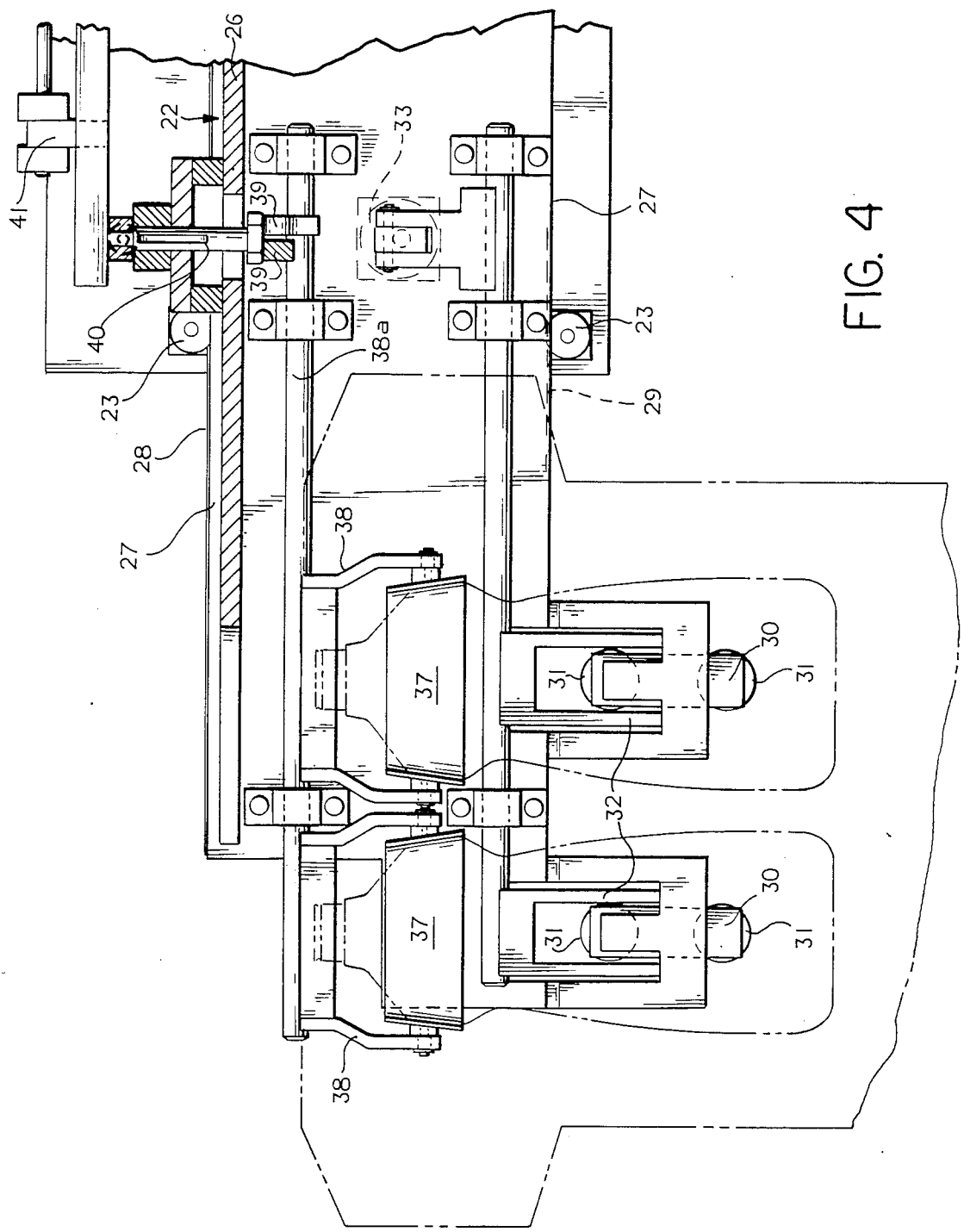
FIG. 4 is a fragmentary sectional view taken along the line 4—4 in FIG. 3.
Figure 5:
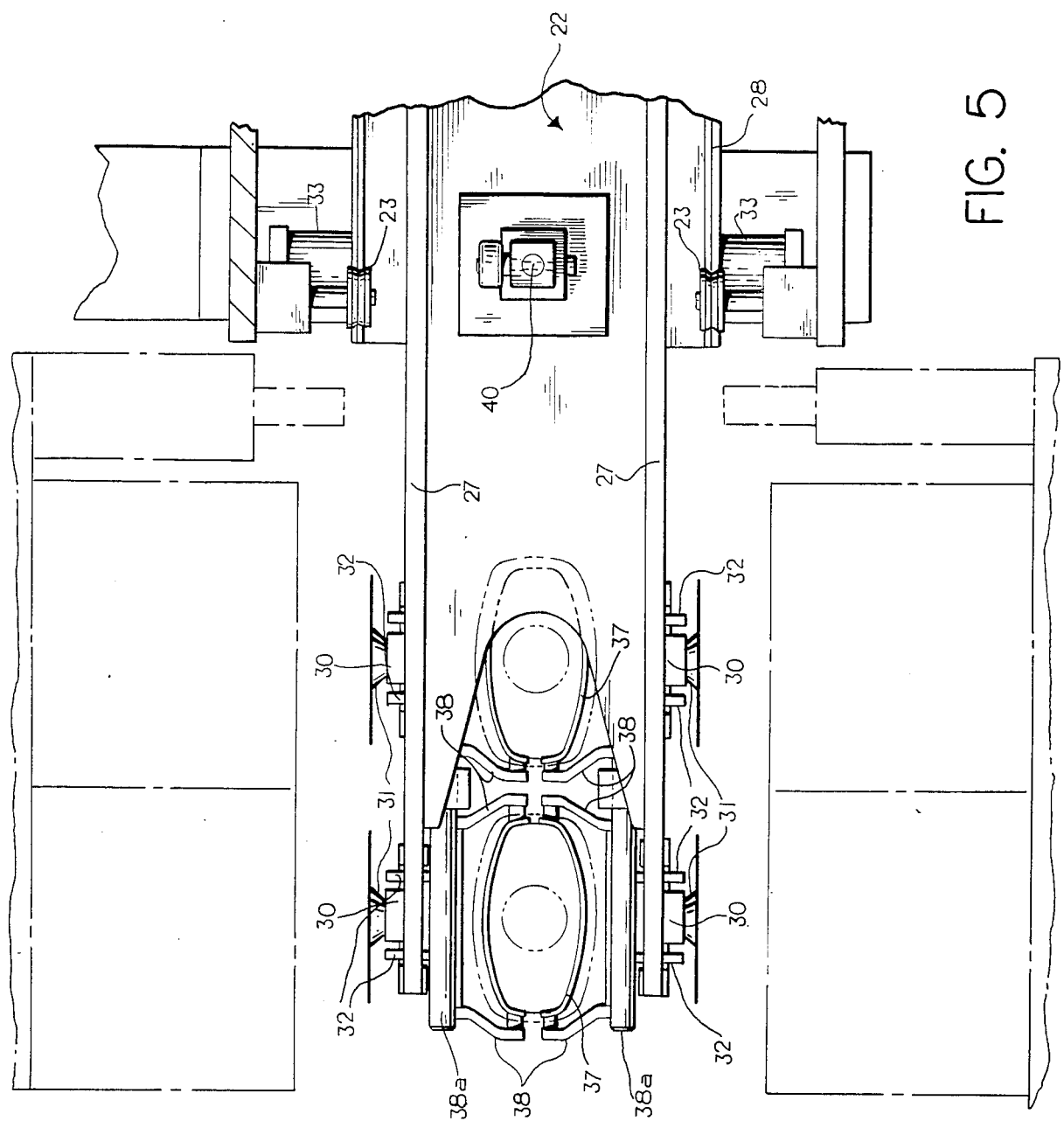
FIG. 5 is a fragmentary plan view on an enlarged scale of a portion of the apparatus shown in FIG. 4.

Referring to FIG. 3, the carriage 22 includes a top plate 26 and side plates 27 which support longitudinally extending guide bars 28, 29 that engage the grooves in the opposed upper and lower sets of rollers 23 to guide the carriage 22. The carriage 22 further rotatably supports pick-up devices, each of which is in the form of a bar 30 supporting vacuum cups 31. Each bar 30 is pivotally mounted on a lever 32 which is pivotally mounted on the carriage 22 intermediate its ends. An air cylinder 33 is mounted on each plate 27 and has its piston pivoted to the upper end of its respective lever 32.

As the carriage is moved to a position adjacent the magazines M, herein shown as two magazines on each side for supplying two cavities of a mold, the pistons of air cylinder 33 are actuated to move the pick-up devices 30 bringing the vacuum cups 31 into position for engaging and removing a label from each magazine M.

The carriage 22 is moved longitudinally by a motor 34 having a pinion 35 on the shaft thereof engaging a rack 36 on the carriage. When the motor 34 is energized, the carriage 22 is moved to bring the pick-up devices with the labels thereon into position within the open mold halves. Thereafter the cylinders 33 are actuated to move the labels within the mold cavities and deliver them to the mold cavities wherein vacuum holes in the molds hold the labels in position until the article or container is blown.

After the mold halves are opened, gripping devices on the carriage also function to engage and hold the containers and then to blow pipes strip the containers from the blow tip. As shown in FIG. 3, the gripping devices comprise clamp members 37 pivotally mounted on arms 38 which are fixed on a shaft 38a and have extensions 39 extending from shaft 38a and operated by a shaft 40 which, in turn, is engaged by a lever 41 pivoted on a fixed frame and the shaft of a piston motor 42 pivoted on the frame to move the grippers 37 toward and away from one another to grip the container.

Thus, as the carriage 22 is reciprocated, it first picks up labels from the magazines M and then is brought into position and stopped within the mold to deliver the labels and pick up the containers. On the return movement of the carriage 22, the containers are delivered to the conveyor 25 and additional labels are picked up for delivery on the next cycle to a position within the blow molds.

Figure 6A:
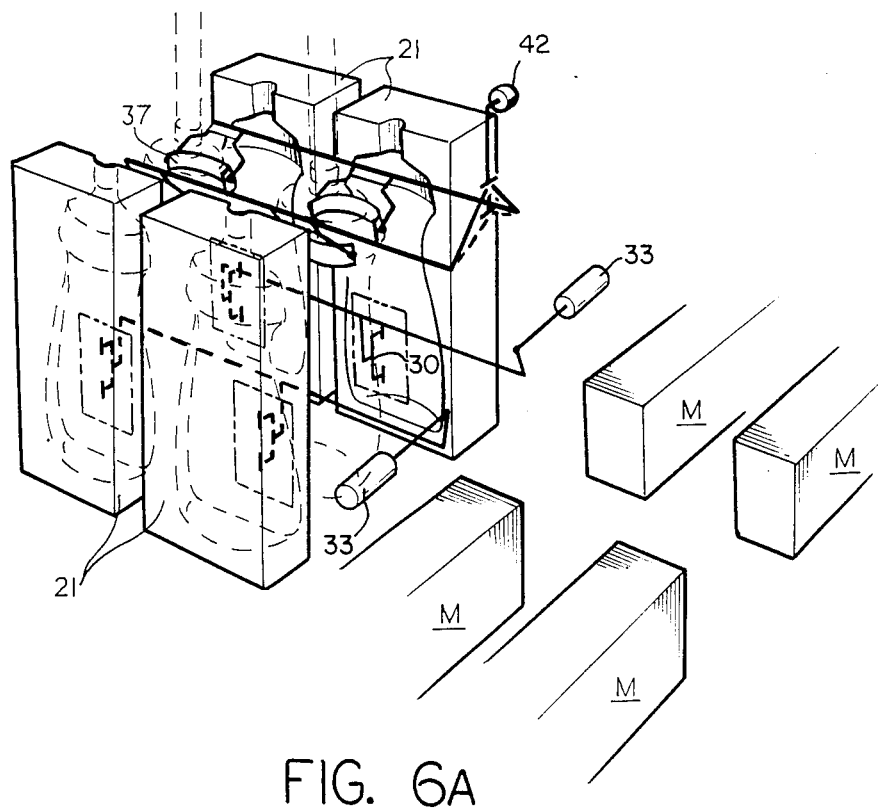
FIGS. 6A and 6B are diagrammatic views showing the various steps in the application of the labels and removal of the containers.
Figure 6B:
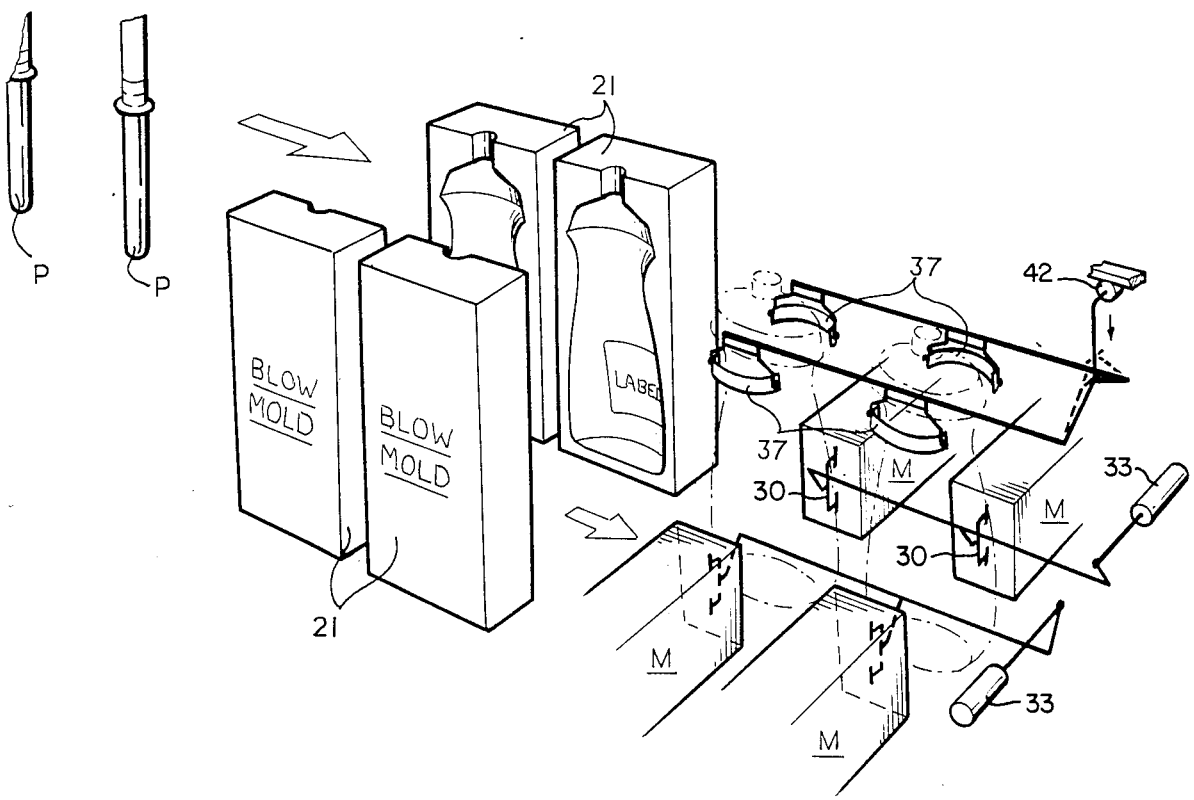

During operation, the carriage 22 and associated parts have relative relationships as shown diagrammatically in FIGS. 6A and 6B. As shown in FIG. 6A, grippers 37 pick up the blown containers at position 1 and the labels are ready for insertion in the blow molds 21. As shown in FIG. 6B, the carriage has retracted the grippers 37 and the label pick-up devices 30 from between the open mold as the preforms or parisons are being moved between molds 21 and the carriage has been moved to deposit the containers on the conveyor and pick up labels from the magazines M.

Figure 7:
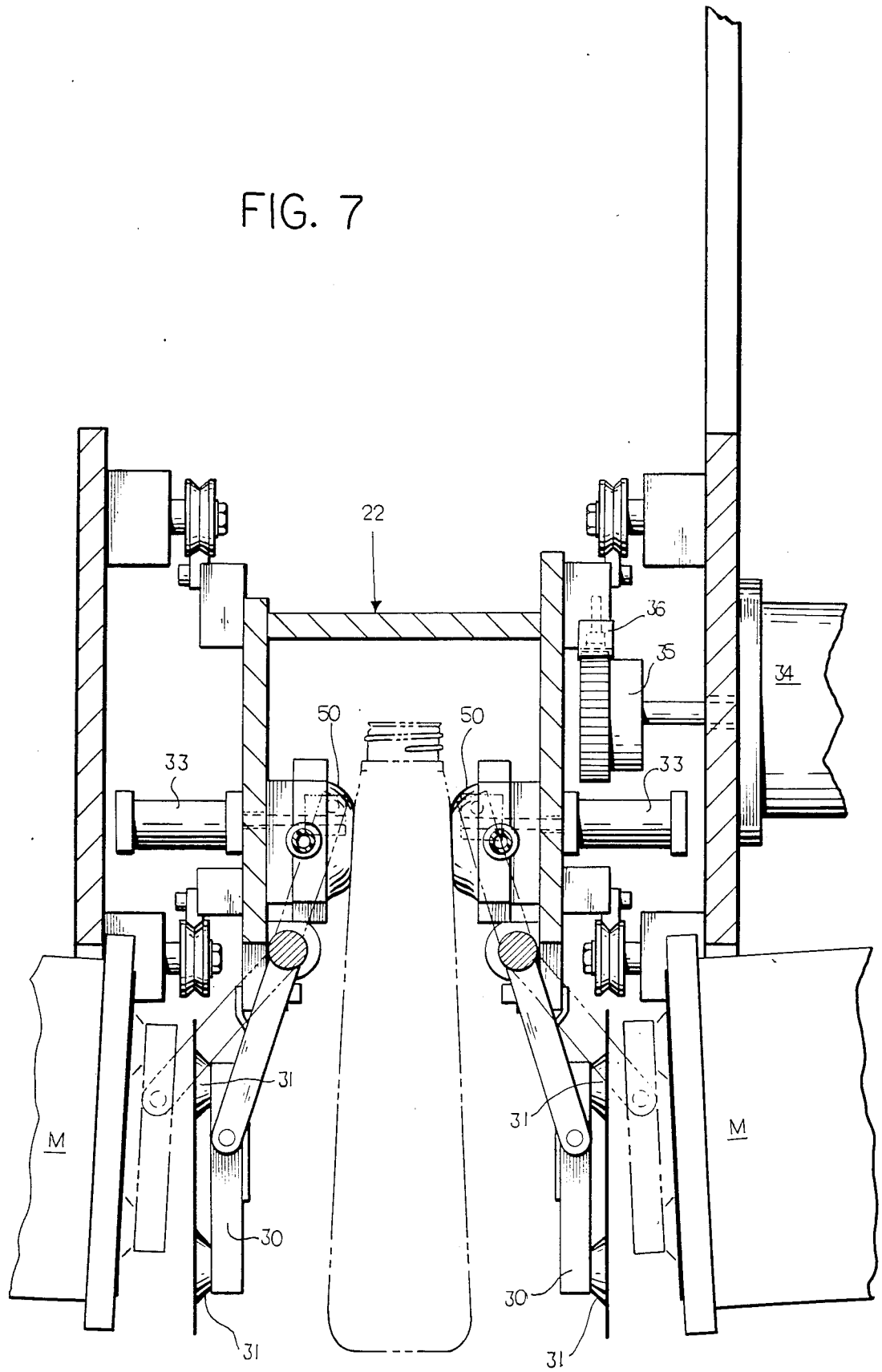
FIG. 7 is a vertical sectional view similar to FIG. 3 of a modified form of apparatus.
Figure 8:
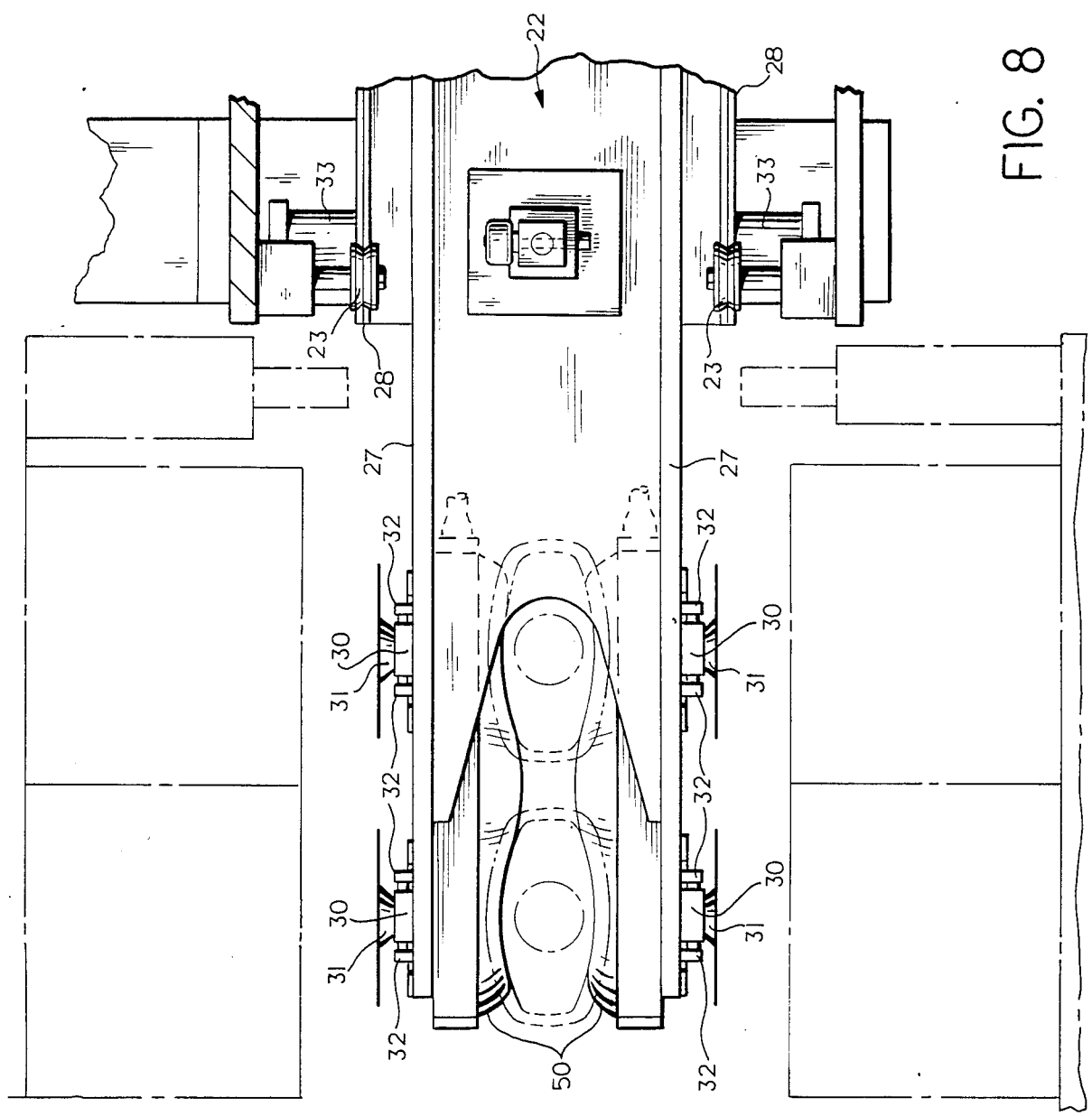
FIG. 8 is a fragmentary plan view of the form of apparatus in FIG. 7.
Figure 9:
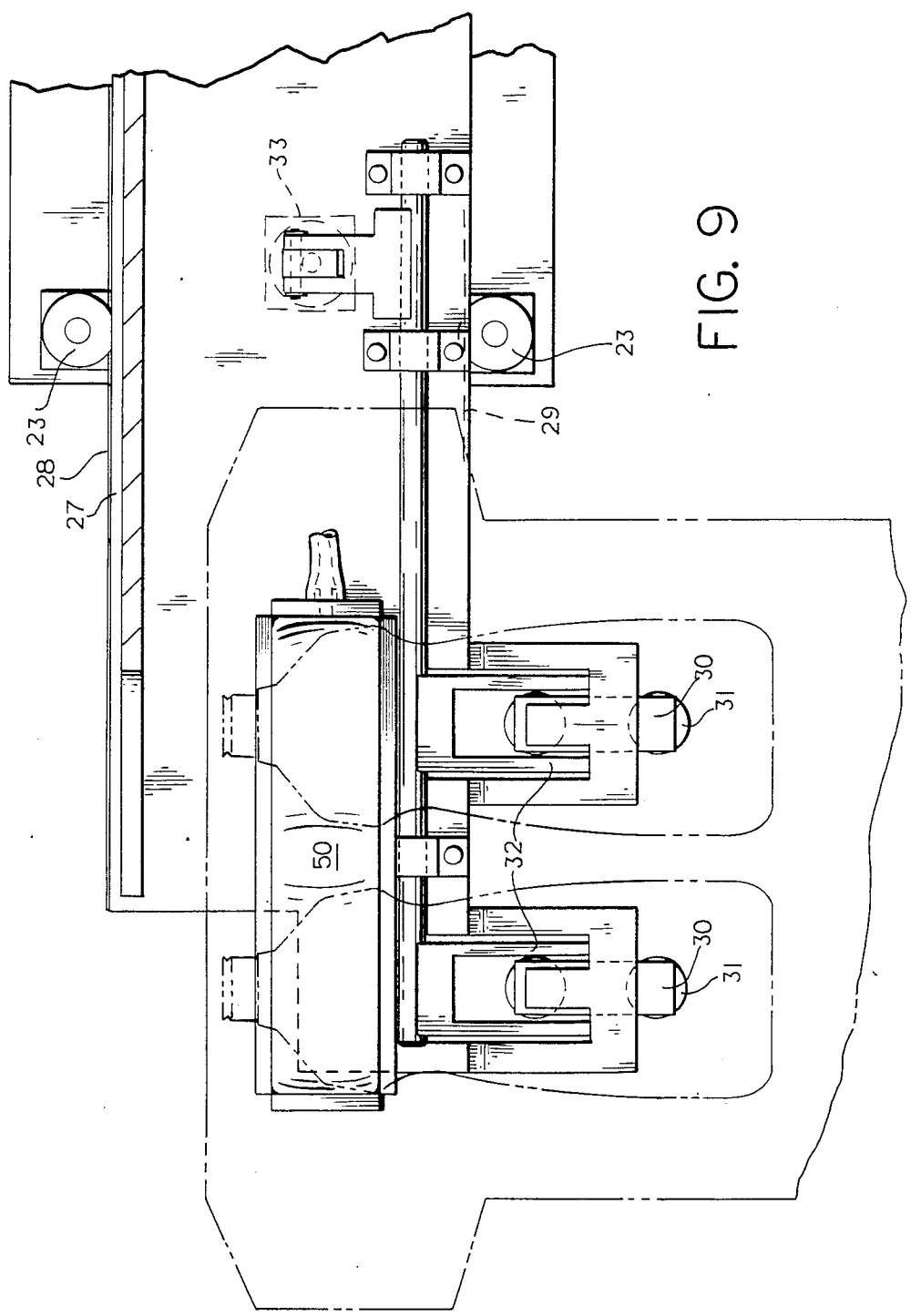
FIG. 9 is a fragmentary sectional view taken along the line 9—9 in FIG. 7.

In the form shown in FIGS. 7-9, the pick-up devices instead of comprising clamps comprise inflatable diaphragms 50 for gripping the container.

Although the invention has been described in connection with a plurality of label magazines, it can also be used with a single label magazine. Although the invention has been described as preferably used with the removal of the containers, it contemplates that the removal may be made in other ways.

We claim:

1. An apparatus for applying labels in a blow molding apparatus which comprises a mold having mold halves that are moved between an open position and a closed position defining a mold cavity against which a plastic parison is blown to define a hollow plastic container wherein the apparatus precludes access to the upper or lower ends of the mold halves, said apparatus further comprising
    a carriage,
    means for supporting said carriage for reciprocating movement along an axis,
    means for horizontally reciprocating said carriage between a first position externally of the blow mold halves and a second position between the blow mold halves when the blow mold halves are open,
    a first magazine positioned at said first position,
    a first label pick-up device,
    means for supporting said first label pick-up device on said carriage for movement transversely of the direction of movement of the carriage,
    means on said carriage for moving said first label pick-up device transversely outwardly to pick up a label when the carriage is at said first position adjacent said label magazine and for moving said first label pick-up device with a label thereon transversely outwardly when the carriage is at the second position for delivering a label to the cavity of the open mold
    a first container removal device including gripping elements for engaging a first blown container formed in the mold,
    means for supporting said first container removal device on said carriage for movement transversely of the direction of movement of the carriage toward and away from the axis of movement of the carriage,
    means on said carriage for moving said gripping elements of said first container removal device outwardly and inwardly such that when the carriage is at said second position, said gripping elements of said first removal device can be moved inwardly toward one another to grip the first blown container prior to delivery of a label to the open mold such that upon movement of said carriage toward the first position, the first blown container is removed from the open mold after which the open mold may be closed about another parison delivery to the open mold having a label thereon for subsequent blowing of said another container when the mold is closed.

2. The apparatus set forth in claim 1 wherein said means for supporting said first label pick-up device comprises
    a longitudinally extending member mounted on said carriage for transverse oscillating movement relative to a longitudinal axis of said longitudinally extending member,
    an arm fixed on said member,
    said first label pick-up device supported on said arm, and means for oscillating said member.

3. The apparatus set forth in claim 2 wherein said means for oscillating said first pick-up device comprises a fluid motor.

4. The apparatus set forth in claim 1 wherein said removal device comprises a longitudinally extending member supporting the gripping elements and mounted on the carriage for oscillating movement about the longitudinal axis of the longitudinally extending member such that oscillation of said member moves the gripping elements transversely into and out of engagement with the first blown container.

5. The apparatus set forth in claim 1 wherein said gripping elements comprises pneumatic grippers expandable into engagement with the first blown container for removing the first blown container from between an open mold when the carriage is at the second position.

6. The apparatus set forth in claim 1 including
    a second magazine positioned in longitudinally spaced relation to said first magazine,
    a second label pick-up device,
    means for supporting said second label pick-up device on said carriage longitudinally of the first label pick-up device corresponding to the longitudinal spacing between the first and second magazines for movement transversely of the direction of movement of the carriage,
    means on said carriage for moving said second label pick-up device transversely outwardly to pick up a label when the carriage is at said first position adjacent said second label magazine and for moving said second label pick-up device with a label thereon transversely outwardly when the carriage is at the second position for delivering a label to a second cavity of an open mold.

7. The apparatus set forth in claim 6 including
    a second container removal device including gripping elements for engaging a second blown container formed in the second cavity mold,
    means for supporting said second container removal device on said carriage for movement transversely of the direction of movement of the carriage toward and away from the axis of movement of the carriage,
    means on said carriage for moving said gripping elements of said second container removal device outwardly and inwardly such that when the carriage is at said second position, said gripping elements of said second container removal device can be moved inwardly toward one another to grip a second blown container prior to delivery of said labels to the open mold such that upon movement of said carriage toward the first position, the first and second blown containers are removed from the open mold after which the open mold may be closed about another pair of parisons delivered to the cavities of the open mold having a label in each cavity for subsequent blowing of said another pair of containers when the mold is closed.

8. The apparatus set forth in claim 1 including
a second magazine at said second position opposite said first mentioned magazine,
a second label pick-up device,
means for supporting said second label pick-up device on said carriage longitudinally of the first label pick-up device corresponding to a longitudinal spacing between the first and second magazines for movement transversely of the direction of movement of the carriage,
said means on said carriage for moving said first label pick-up device also moving said second label pick-up device transversely outwardly an opposite direction from the direction of movement of said first-mentioned label pick-up device to pick up a second label when the carriage is at said first position adjacent said second label magazine and for moving said second label pick-up device with a label thereon transversely outwardly when the carriage is at the second position for delivering a label to said cavity of the open mold.

9. The apparatus set forth in claim 8 wherein said means for supporting said second label pick-up device comprises
a longitudinally extending member mounted on said carriage for transverse oscillating movement relative to a longitudinal axis of said longitudinally extending member,
a pair of arms fixed on said member,
said second label pick-up device supported on each arm,
and means for oscillating said member.

10. The apparatus set forth in claim 7 wherein said second removal device comprises a longitudinally extending member supporting the gripping elements and mounted on the carriage for oscillating movement about the longitudinal axis of the longitudinally extending member such that oscillation of said member moves the gripping elements transversely into and out of engagement with the second blown container.

11. The apparatus set forth in claim 7 wherein said gripping elements comprise pneumatic grippers expandable into engagement with the second blown container for removing the second blown container from between an open mold when the carriage is at the second position.

* * * * *